United States Patent [19]
Fukuda

[11] Patent Number: 6,091,908
[45] Date of Patent: Jul. 18, 2000

[54] PHOTOMETRIC DEVICE AND METHOD FOR A CAMERA

[75] Inventor: Hiroyuki Fukuda, Kanagawa-Ken, Japan

[73] Assignee: Nikon Corporation, Tokyo, Japan

[21] Appl. No.: 08/869,088

[22] Filed: Jun. 4, 1997

Related U.S. Application Data

[63] Continuation of application No. 08/637,549, Apr. 25, 1996, abandoned, which is a continuation-in-part of application No. 08/488,735, Jun. 8, 1995.

[30] Foreign Application Priority Data

Jul. 18, 1994 [JP] Japan ................................ 6-165336
Jul. 14, 1995 [JP] Japan ................................ 7-179054

[51] Int. Cl.$^7$ ............................. G03B 7/097; G03B 7/08; G03B 13/36
[52] U.S. Cl. ......................... 396/234; 396/236; 396/122
[58] Field of Search ........................... 396/213, 233, 396/234, 236, 50, 121, 122, 123, 124

[56] References Cited

U.S. PATENT DOCUMENTS

| | | | |
|---|---|---|---|
| 4,395,099 | 7/1983 | Terasita | 354/31 |
| 4,774,401 | 9/1988 | Yamada et al. | 354/432 |
| 4,855,780 | 8/1989 | Hayakawa | 354/432 |
| 4,980,716 | 12/1990 | Suzuki et al. | 354/403 |
| 5,083,150 | 1/1992 | Nagasaki et al. | 354/402 |
| 5,253,008 | 10/1993 | Konishi et al. | 354/402 |
| 5,258,795 | 11/1993 | Lucas | 354/289.12 |
| 5,302,997 | 4/1994 | Cocca | 354/432 |
| 5,379,088 | 1/1995 | Ueda et al. | 354/430 |
| 5,592,256 | 1/1997 | Muramatsu | 396/225 |

*Primary Examiner*—Safet Metjahic
*Assistant Examiner*—Michael Dalakis
*Attorney, Agent, or Firm*—Oliff & Berridge, PLC

[57] ABSTRACT

A photographic device eliminates photometric errors that occur in photometry, obtains a more accurate exposure, and shortens the time required for photometry. The device includes an orientation position detector and photographic mode setter, which outputs photographic conditions based on a set photographic mode. A photometer divides the subject field into multiple regions and analyzes the light. An exposure calculator calculates the exposure value based on the output of the photometer. A memory stores weighing coefficients corresponding to multiple light brightness patterns. A tilt switch position orientation detector determines the position of the camera. A selector selects the weighing coefficients from the memory, based on the photographic mode setting component output and the position of the camera. A frequency analyzer then analyzes the output frequency of the photometer. A re-calculator re-calculates the exposure value based on the result of the frequency analyzer and the selection of the selector.

33 Claims, 8 Drawing Sheets

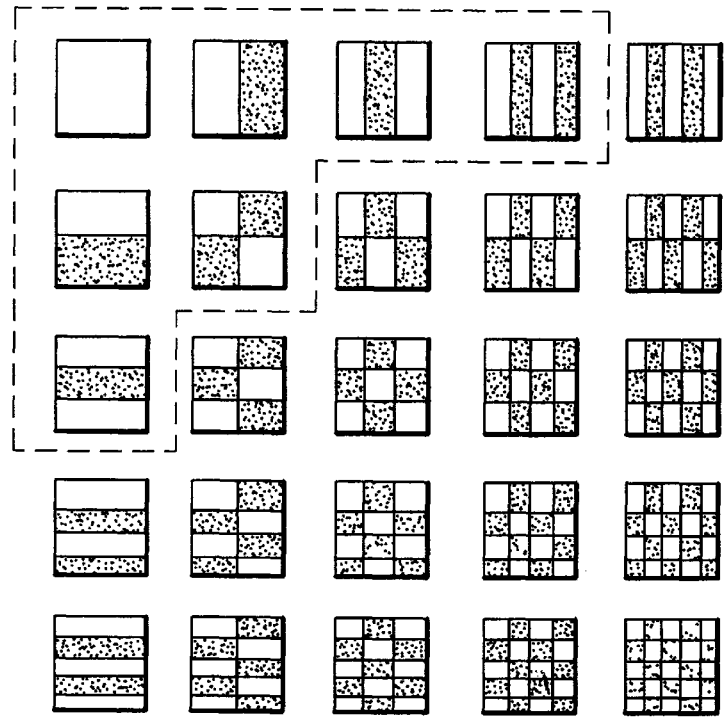
FIG. 2(a)
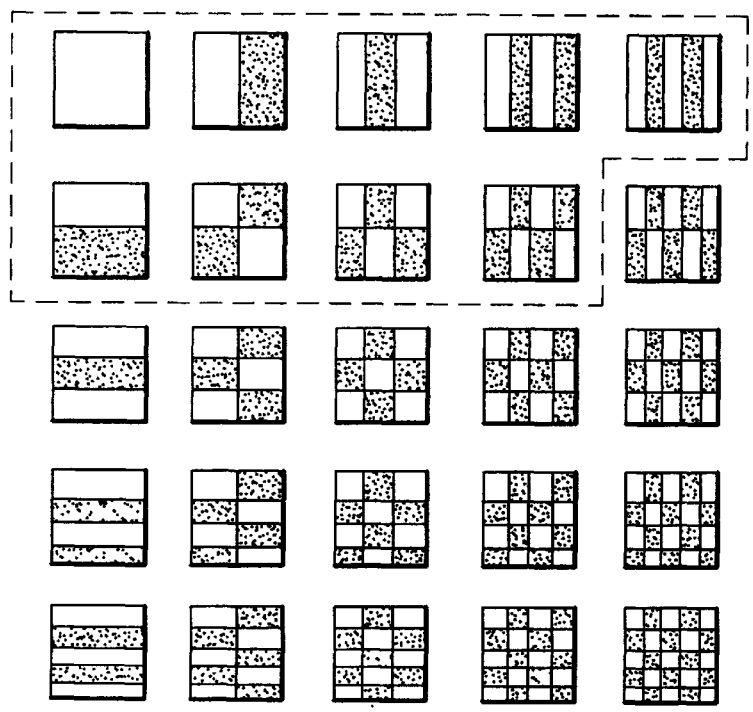
FIG. 2(b)
FIG. 2(c)

PHOTOMETRIC DEVICE AND METHOD FOR A CAMERA

This is a Continuation of application Ser. No. 08/637,549 filed Apr. 25, 1996 now abandoned, which in turn is a Continuation-in-Part of application Ser. No. 08/488,735, filed Jun. 8, 1995.

BACKGROUND OF THE INVENTION

1. Field of the Invention

The present invention relates to a photometric device for a camera. A photometric device measures the characteristics of light, including brightness and intensity. The photometric device according to the instant invention eliminates measurement errors, obtains an accurate exposure value for a camera and shortens the time needed for the actual measurement.

2. Description of Related Art

Conventionally, a camera's photometric device divides the subject field into multiple regions and carries out the measurement of the light and determines its brightness and intensity. The device then calculates an exposure value for the camera according to the intensity and brightness. In recent years, this dividing method has become common in photometric devices for cameras. Further, the number of divisions in the process has increased. By increasing the number of divisions, photographic scenes can be appropriately classified and highly detailed control can be carried out according to the particular scene. Thus, in classifying a photographic scene, the greater the number of divisions, the better the quality of photograph.

However, there are situations where different exposure values are required, even when the photographic scenes are divided in similar patterns. For example, when a scene is recognized as having a high ultimate brightness with a large difference in the scene's brightness, the scene may be considered a hypothetical scene of a backlighted person, with the sun in the background. The exposure is calculated for a low-brightness subject. However, if the person is bathed in light that is filtered through trees, even though the scene is similar, the parts illuminated by the sun become over-exposed. Thus, there are scenes that cannot be adequately classified using conventional methods.

Applicant has proposed a photometric device of a camera in Japanese Unexamined patent Application 5-163919, published Dec. 22, 1994, which determines the light brightness pattern of the subject field. This device carries out a frequency analysis of the subject field's light brightness patterns and calculates a corrected exposure value. The corrected exposure values are calculated by weighting certain values for each brightness pattern, based on the brightness determination. Using this method, detailed photometry is possible.

In the above device, in order to eliminate photometric errors and to obtain accurate exposure values, the number of light brightness patterns used in the weighting can be increased. However, if there are too many light brightness patterns, the required calculation time becomes excessive and it is impractical to accurately take photographs.

SUMMARY OF THE INVENTION

An object of the present invention is to provide a photometric device for a camera in which photometric errors are eliminated, more accurate exposures are obtained, and the time required for photometry is shortened. This and other objects are accomplished by setting necessary light brightness patterns for each particular photography mode.

The photometry device includes a photographic mode setter, which outputs photographic conditions based on a preset photographic mode. For example, one particular mode may correspond to a panoramic photographic mode. The photometry device divides the subject field into multiple regions and carries out the light measurement. An exposure calculator calculates an exposure value based on the photometry device's output. A memory is provided to store weighting coefficients, which correspond to multiple light brightness patterns. The photometry device also includes a selector for selecting the appropriate weighting coefficients from the memory. This selection is based on the output of the photographic mode setter. A frequency analyzer then analyzes the frequency of the photometry device's output. A re-calculator next re-calculates the exposure value, which had been previously calculated by the exposure calculator, based on the result of the frequency analyzer and the result of the selector. The re-calculated exposure value permits more accurate photographs of scenes with varying light intensities.

Another object of the invention is recognized by providing a photometry device including a lens information holder containing information about the zoom lens. The photometry device divides the subject field into multiple regions and carries out the light measurement. An exposure calculator determines the exposure value based on the output of the photometer. A memory is provided to store weighting coefficients, which correspond to multiple light brightness patterns. A selector then selects the appropriate weighting coefficients from the memory, based on the output of the lens information holder. A frequency analyzer analyzes the frequency of the output of the photometry device. Next, a re-calculator re-calculates or re-determines the exposure value, which had been previously calculated by the exposure calculator, based on the result of the frequency analyzer and the result of the selector. Thus re-calculated exposure value permits more accurate photographs of scenes with varying light intensities.

A further object of the invention is achieved by providing a table having multiple weighting coefficients included in a memory. The selector selects one value from the weighting coefficients. The re-calculator will then calculate a correction value Ho, according to the following equation:

$$Ho = \Sigma\Sigma W(i,j) \cdot P(i,j)$$

where, $P(i,j)$ is a light brightness or power spectrum, which is determined by the CPU 6, analyzed by the frequency analyzer and $W(i,j)$ is the weighting coefficient. The correction value is used in delivering the new exposure value.

A still further object of the invention is achieved by providing a photometry device including a lens information holder containing information about the zoom lens. The photometry device divides the field subject into multiple regions and carries out the light measurement. An exposure calculator determines the exposure value based on the output of the photometer. An orientation detector determines the orientation of the camera at a time prior to taking a photograph. A selector then selects an appropriate weighting coefficients based on the lens data, a photographic detected orientation and the detected mode. A frequency analyzer analyzes the frequency of the output of the photometry device. Next, a recalculator recalculates or redetermines the exposure value, which had been previously calculated by the exposure calculator, based on the result of the frequency analyzer and the result of the selector. Thus, recalculated exposure permits a more accurate photographing of scenes of with varying light intensities.

Other objects, advantages and salient features of the invention will become more apparent from the following detailed description which when taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein:

FIGS. 2(a)–2(c) are drawings that illustrate examples of the brightness patterns in a photometric device, according to the first preferred embodiment;

DETAILED DESCRIPTION OF PREFERRED EMBODIMENTS

Figure 1:
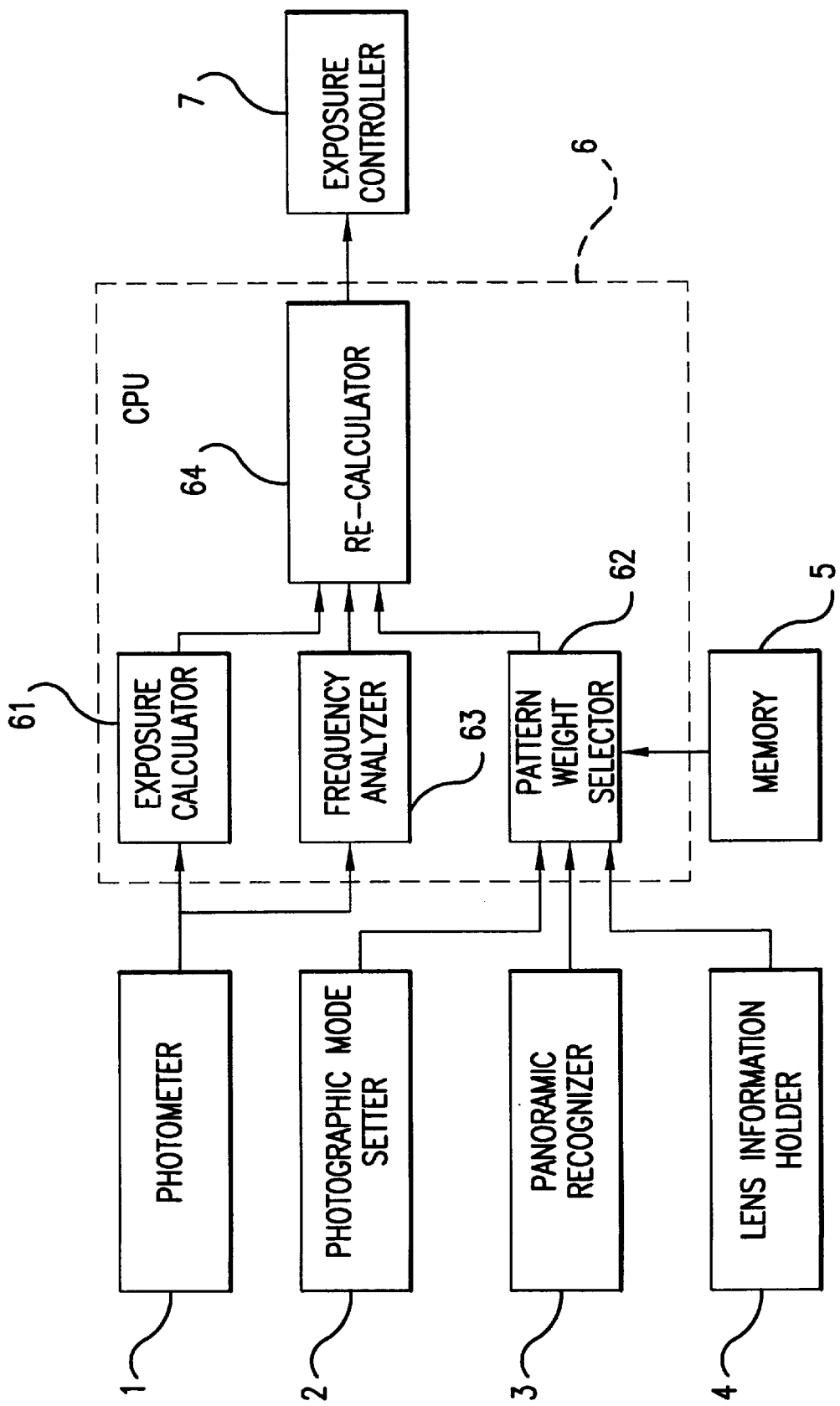
FIG. 1 is a block diagram showing a first preferred embodiment of the photometric device.

FIG. 1 is a block diagram illustrating the first preferred embodiment of the photometric device for a camera. Photometer 1 carries out measurement of light brightness and intensity, through a multi-division photometry process. It is desirable for the number of divisions to be as large as possible, because this obtains a higher quality photograph.

The photographic mode setter 2 outputs photographic conditions corresponding to the previously set photographic mode. Photographic modes preferably include a portrait mode, panoramic mode, landscape mode, close-up mode, and the like. These modes are only examples. Photographs with particular mode characteristics can be taken with a camera provided with a photographic mode setter.

A panoramic recognizer 3 determines whether or not the photographic condition set by the mode setter 2 has been set for panoramic photography. The panoramic recognizer can determine the panoramic setting by either mechanical or software-based method or other equivalent method.

The lens information holder 4 detects the type of lens being used with the camera during the photography. Specifically, the lens information holder 4 detects at least the length of a zoom lens and the photography distance, through direct communication with the lens. The method of reading lens information is not limited to a direct communication. The lens information may be read by a mechanical or other suitable method.

Weights or weighting coefficients, corresponding to light brightness patterns, are stored in and contained within a memory 5. The method of storing the coefficients in the table is not limited to any particular method. In this example, a ROM is used to store the information. FIGS. 2(a)–2(c) show the representative light brightness patterns. The weights or coefficients are established by analyzing the frequency of many photographs. A computer then learns these analyzed values. The computer can use a neuro-method or any other similar learning method.

The signals from the photometer 1, photographic mode setter 2, panoramic recognizer 3, lens information holder 4, and memory 5 are all connected to a controller, for example a CPU 6. The construction of such a CPU 6 will next be explained in detail.

The CPU 6 includes at least an exposure calculator 61, a pattern weight selector 62, a frequency analyzer 63, and a re-calculator 64. The exposure calculator 61 calculates or determines an exposure value, based on the output of the photometer 1. An output of the exposure calculator 61 is connected to the re-calculator 64.

The pattern weight selector 62 chooses or selects an appropriate weight or weighting coefficient corresponding to the light brightness pattern from the memory 5. The pattern weight selector 62 extracts multiple light brightness pattern weights from the memory 5 based on the mode set by the photographic mode setter 2. The extraction criteria in the pattern weight selector 62 for each photographic mode can be pre-set in the photometric device.

The extraction criteria is described using the landscape mode as an example. A main characteristic of a landscape mode is that, most often, the photographic subject is not people or narrow objects but has a landscape as a whole as the subject. When the brightness pattern from such a landscape photograph is analyzed, the group of brightness patterns is shown by the patterns inside the dotted line in FIG. 2(a). The configuration of this group is used because a monotonic striped pattern is stronger than a lattice pattern.

The pattern weight selector 62 then selects weights that correspond to light brightness patterns. The selection is based on information received from the panoramic recognizer 3. Panoramic photography cuts the normal subject field at the top and bottom and photographs a wide subject field. Thus, when the brightness pattern is analyzed for a panoramic photograph, the brightness patterns are shown inside the dotted line in FIG. 2 (b). These brightness patterns exhibit a weak vertical brightness and a strong horizontal brightness.

Similarly, the pattern weight selector 62 can extract multiple brightness patterns relating to the photography distance and the zoom magnification. This selection is based on information received from the lens information holder 4. The pattern weight selector 62 extraction criteria are also determined by the photography distance and zoom magnification.

The frequency analyzer 63 analyzes the output of the photometer 1. A detailed description is given in conjunction with the cooperating features.

The re-calculator 64 re-calculates or redetermines the exposure value, which was previously calculated by the exposure calculator 61. The recalculation is based on multiple light brightness patterns selected by the pattern weight selector 62 and the result determined by the frequency analyzer 63. The recalculator 64 calculates a correction value Ho for the exposure value through the following formula (1):

$$Ho = \Sigma\Sigma W(i,j) \cdot P(i,j) \qquad (1)$$

where P(i,j) is the light brightness or power spectrum, determined by the CPU 6 and analyzed by the frequency analyzer and W(i,j) is the weighting coefficient. The correction value Ho is used to determine a new exposure value, which results in a higher quality photograph.

CPU 6 has an output connected to an exposure controller 7. The exposure controller 7 is capable of controlling the shutter (not shown) and the diaphragm (not shown), based on the re-determined exposure value.

Figure 6:
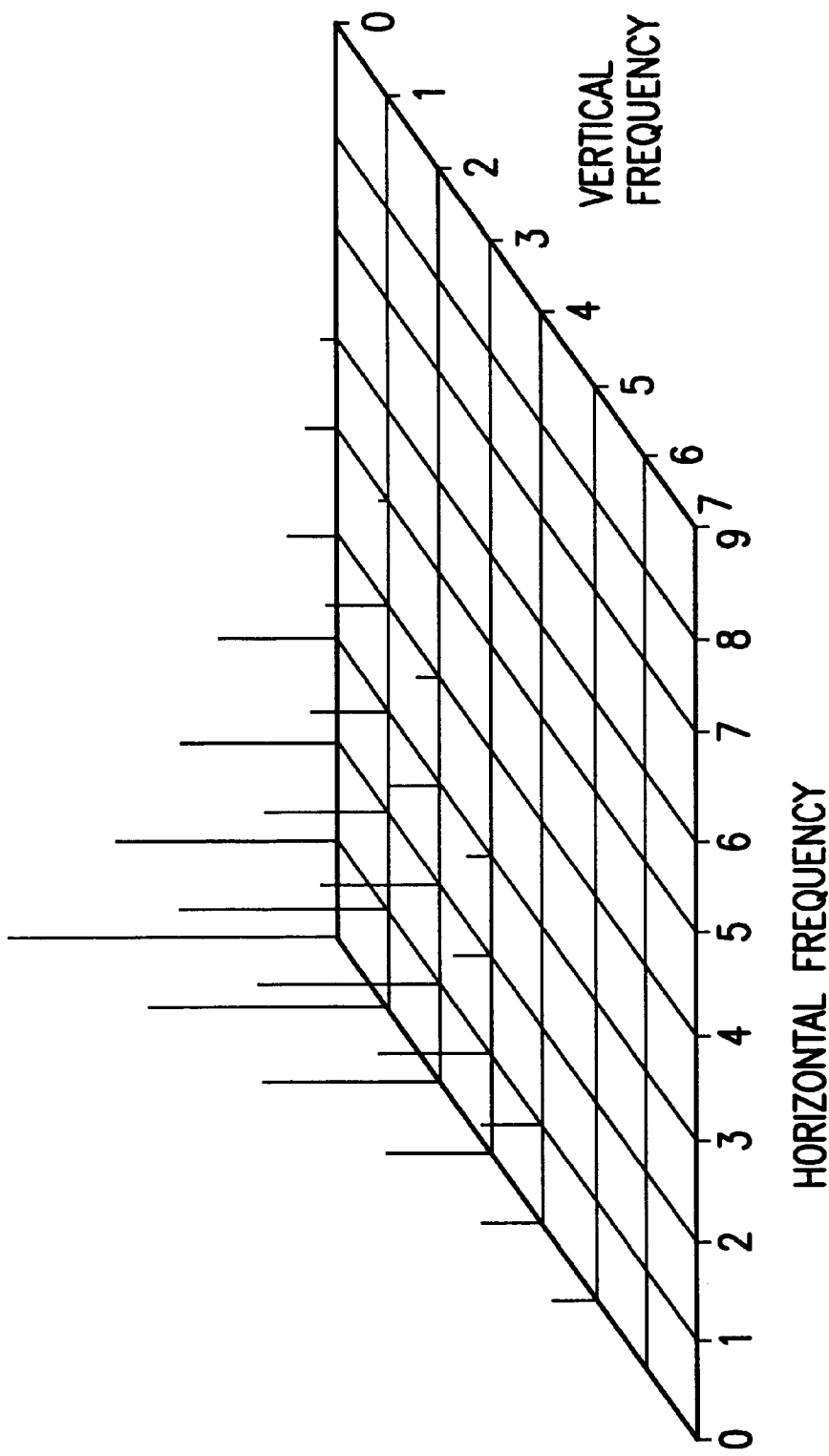
FIG. 6 is a power spectrum chart that shows a frequency for the brightness patterns of the photometric device.

The connection between the light brightness patterns and analysis of the frequency is described, with reference to FIGS. 2(*a*)–2(*c*) and 6. The white blank square in FIG. 2(*a*) indicates that neither a vertical nor a horizontal brightness pattern exists. When this condition is expressed by a power or light brightness spectrum for each frequency in FIG. 6, the power or light brightness spectrum shows 0, for both the vertical and horizontal frequency. The frequencies and brightness patterns combine as a result of a power or light brightness spectrum of 0.

The frequency analyzer 63 analyzes the frequency of the subject field. The frequency analyzer 63 sets a weight for each frequency according to the analyzed values. The frequency analysis for the subject field uses the output value of the photometer 1 and the CPU 6 in turn calculates the power or light brightness spectrum. The frequency analysis method is not limited to the above-identified particular method. For example, a Fourier transform or any other appropriate method may be used. In this embodiment, the frequency indicates a light brightness pattern of the subject field. Specifically, the brightness pattern of FIG. 2(C) shows a frequency representing one vertical and one horizontal pattern.

Figure 3:
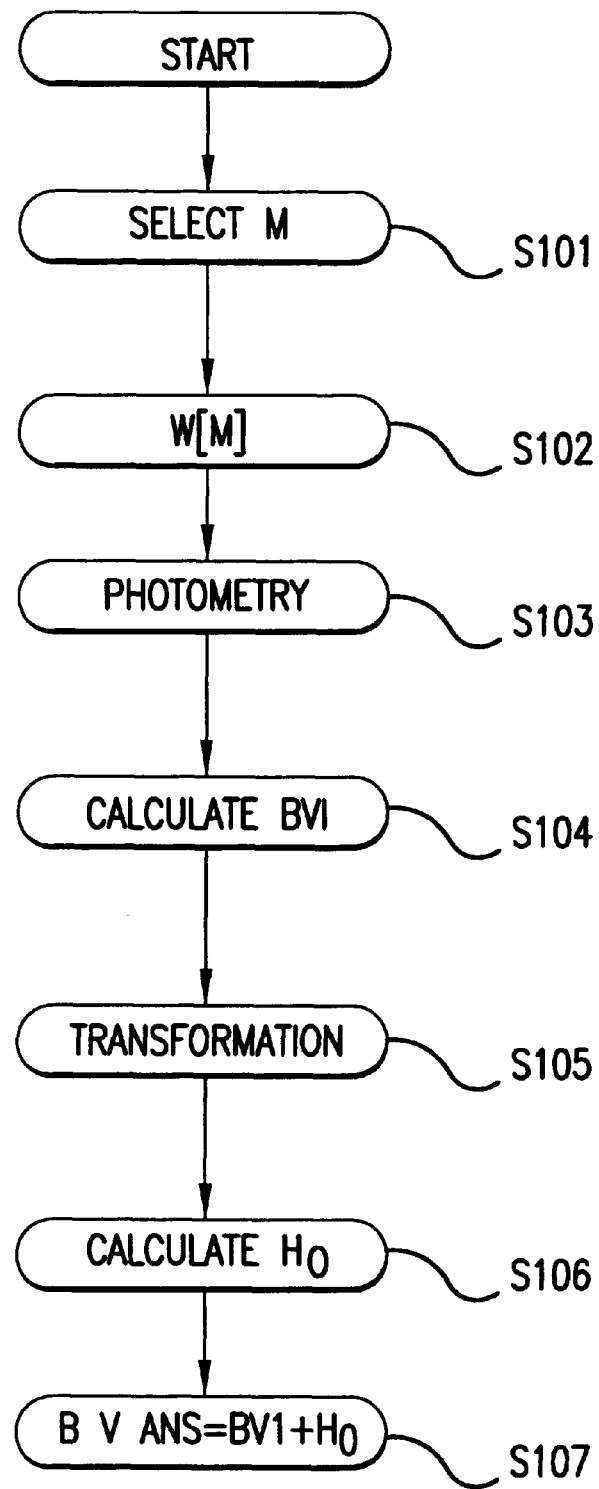
FIG. 3 is a flow chart for the first preferred embodiment of the photometric device.

FIG. 3 shows the process and steps (shown as S101, S102, . . . ) used by CPU 6 in the camera's photometric device according to the preferred first embodiment of the invention.

CPU 6 determines the selected photographic mode M according to the photographic scene determination in step 101. In step 102, the CPU 6 extracts a weight W[M] for the brightness pattern relating to the particular mode M, determined in step 101. The weight is selected or extracted from the multiple brightness patterns stored in the memory 5. The extraction in step S102 relies on tables in the memory 5, which are prepared in advance, for each mode M and weight W(i,j) for each mode. The modes M and weights W(i,j) correspond to the brightness patterns for each individual mode M.

In step 103, the CPU 6 acts to control the photometer and to carry out a multi-division light measurement. A photometric value is obtained as a result of step 103. In step 104, the CPU 6 calculates a brightness value, BV1, based on the photometric value obtained in step 103.

The CPU 6 transforms the photometric value obtained in step 103 in step 105. By using an appropriate transformation, such as a Fourier transformation, the CPU 6 determines a light brightness or power spectrum P(i,j) for the subject field in the particular mode M. The light brightness or power spectrum P(i,j) refers to the relationship and extent which the light brightness patterns relate to individual horizontal and vertical frequencies.

In step 106, a correction value Ho is obtained, using equation (1) and the light brightness or power spectrum P(i,j) obtained in step 105, and the weight W(i,j) extracted from the memory in step 102. Specifically, Ho=ΣΣW(i,j)·P(i,j). In step 107, the CPU 6 calculates the brightness value BVans, from the sum of BV1 and from the correction value Ho.

Figure 4:
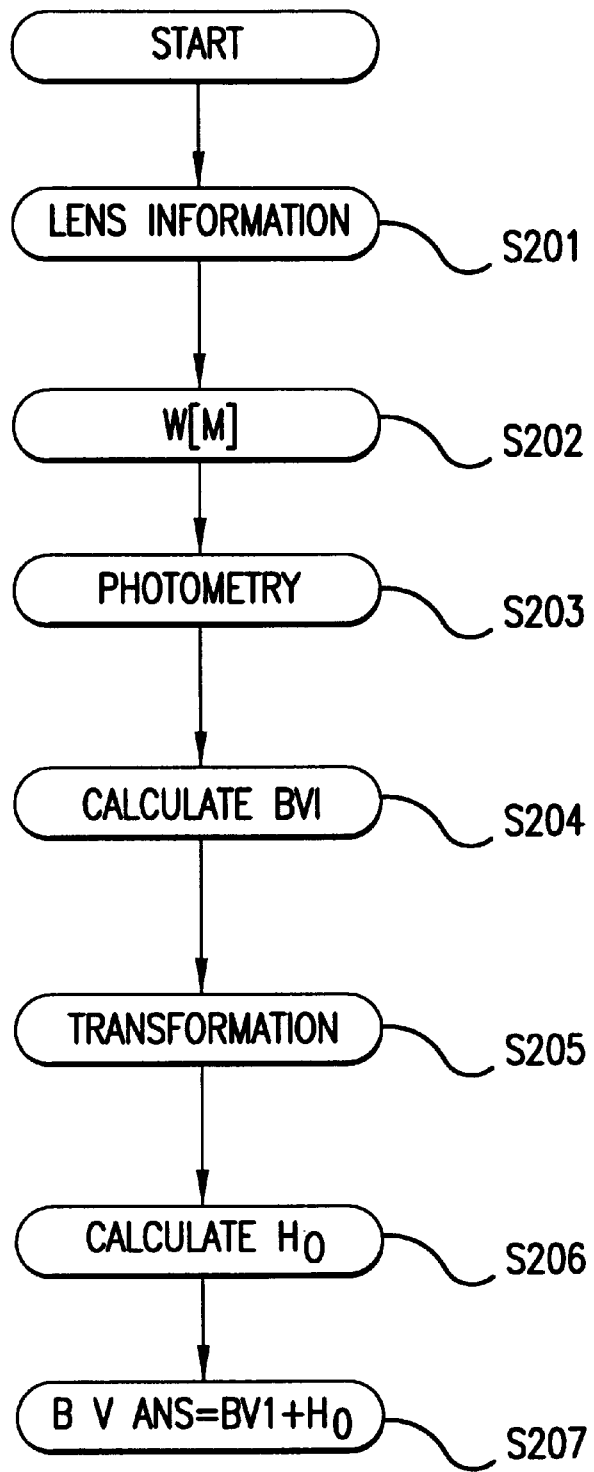
FIG. 4 is a flow chart for a second preferred embodiment of the photometric device.

FIG. 4 is a flow chart showing the process and steps for a second embodiment of the photometric device for a camera. Since the structure of the second and third embodiments (described hereafter) is the same as the block diagram of FIG. 1, with the photography mode setter 2 and the panoramic recognizer 3 removed, a block drawing is omitted.

At step 201, the CPU 6 reads lens information from the lens information holder 4. In step 202, the CPU 6 extracts a weight for the brightness pattern, with respect to the lens information of step 202. The weight is selected or extracted from weights in tables, which are prepared in advance for each mode M and weight W (i,j) corresponding to the multiple brightness patterns stored in memory 5. The modes M and weights W(i,j) are stored for each individual particular mode M.

Steps 203 to 207 are identical to steps 103–107 of the first embodiment. Therefore, the description of these steps is not repeated.

Figure 5:
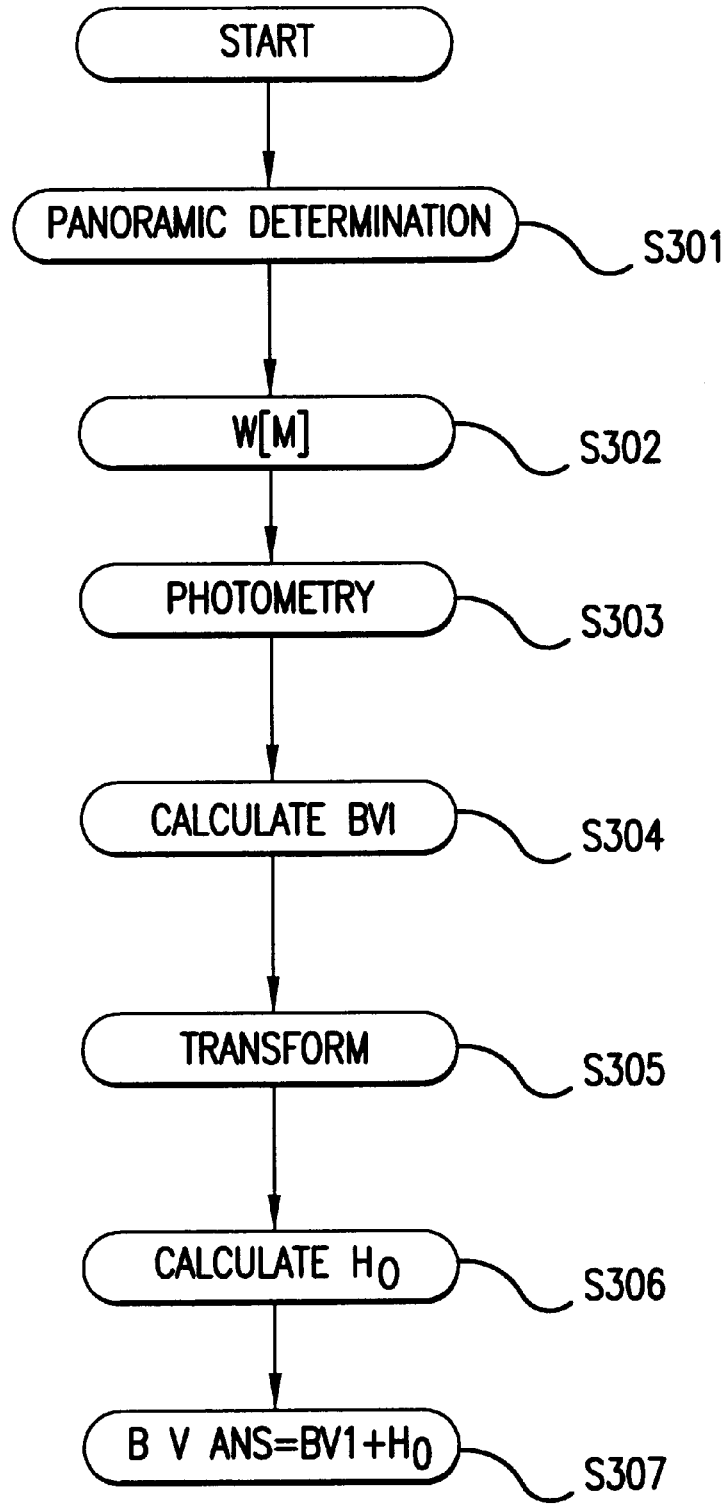
FIG. 5 is a flow chart for a third preferred embodiment of the photometric device.

FIG. 5 is a flow chart illustrating the process and steps for a third embodiment of the photometric device for a camera.

In step 301, the CPU 6 determines if the camera is set to panoramic mode from the panoramic recognizing holder 3. In step 302, the CPU 6 extracts a weight for the brightness pattern, based on the mode determination, when the weight corresponds to the multiple brightness patterns stored in the memory 5 in tables, which are prepared in advance for each mode M and weight W[M]. The modes M and weights W[M] are stored for each individual modes M.

Steps 303–307 are the same as steps 103–107 of the first embodiment. Therefore, the description of these steps is not repeated.

Figure 7:
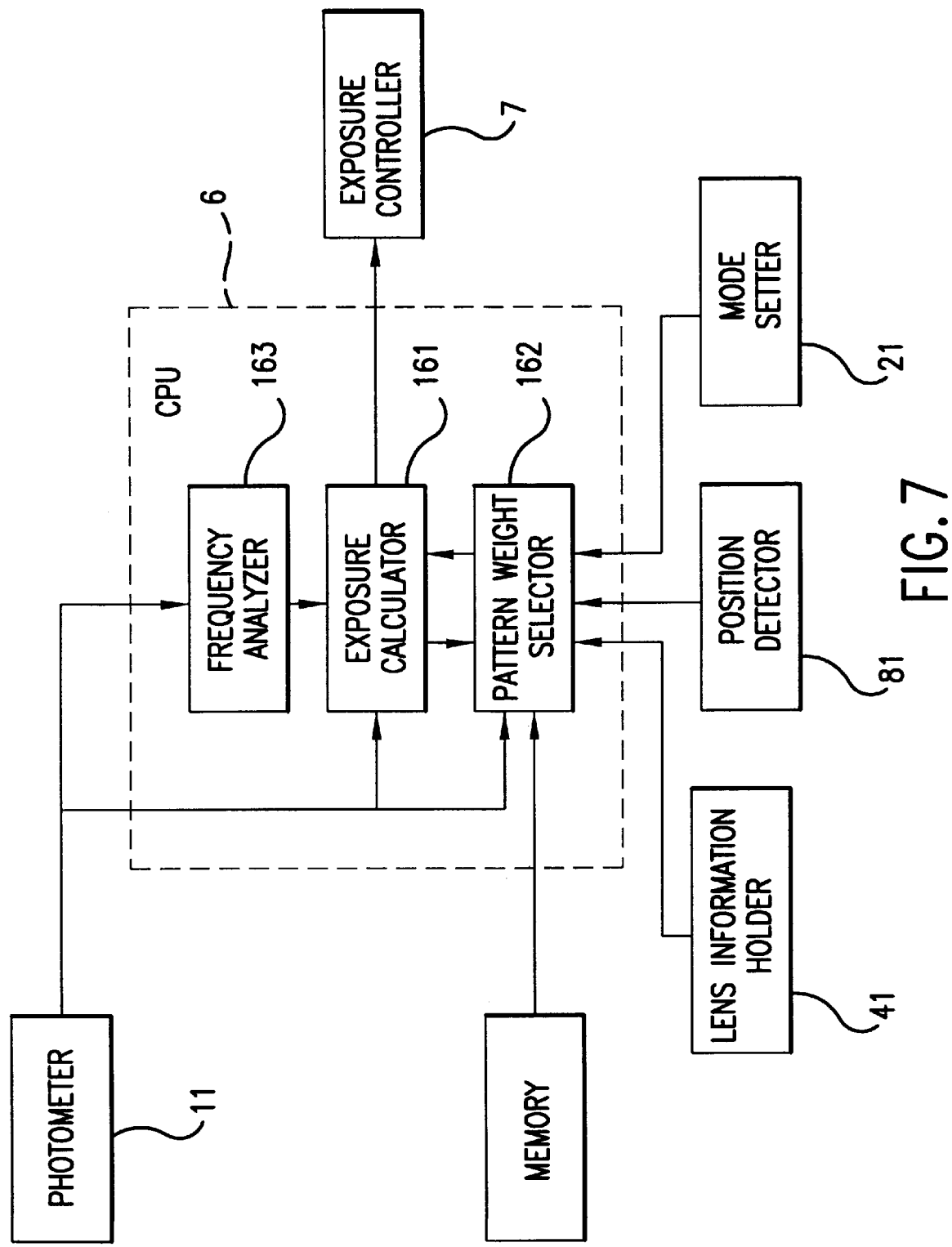
FIG. 7 is a block diagram showing a fourth preferred embodiment of the invention.
Figure 8:
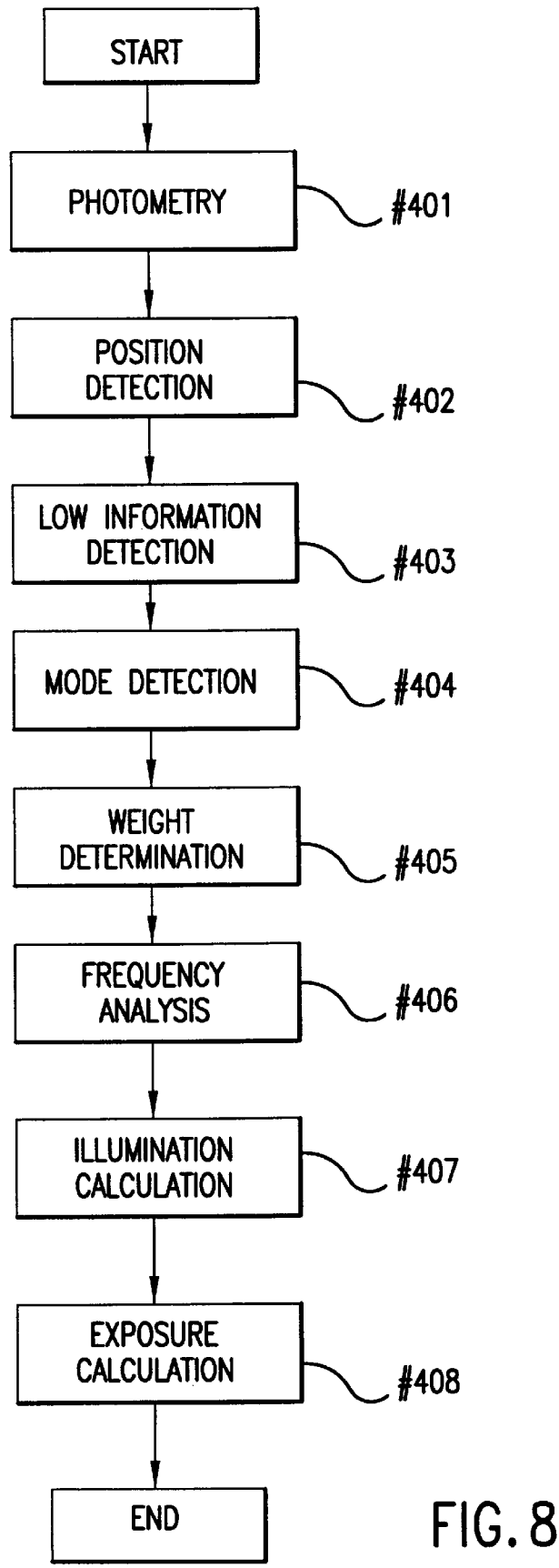
FIG. 8 is a flowchart that illustrates the control of the fourth preferred embodiment.

The fourth preferred embodiment of the invention will now be described with reference to FIGS. 7 and 8. FIG. 7 is a block diagram that illustrates the process and steps of the fourth preferred embodiment of the invention. FIG. 8 is a flowchart that illustrates the control of the photometry device in accordance with the fourth embodiment of the invention.

Photometer 11 carries out measurement of light brightness and intensity through a multi-division photometry process. It is desirable for the number of divisions be large as possible as this permits a higher quality photograph. Further, it is preferable that there be as many photometry partitions as possible, and that these partitions form a matrix. The photometer 11 may take any known form, such as, for example, a storage-type photoelectric conversion element or charge control device, CCD. Further, the photoelectric conversion element can include any number of matrix partitions, and, for example, may include 240 partitions.

A mode detection component 21 detects the mode that the camera is set to perform the photographing. Whereas mode setting in most modern cameras is controlled by an internal CPU, the mode detection components 21 transmits the detected camera mode to a CPU 61 in the form of a camera mode signal. The detected mode may be either a photography program mode that is determined by a preprogrammed routine, or a mode, which designates the photometry method.

Lens information holder 41 detects the type of lens being used with the camera during the photography. Specifically, the lens information holder 41 detects at a minimum the length of the zoom lens in a photography distance. The lens information holder 41 may obtain this information by, for example, direct communication with the lens. The method of reading lens information is not limited to direct communication. For example, the lens information detection may utilize a ROM, which stores lens information in the lens itself.

The lens information is then be detected and transmitted to the CPU 61. The contents of the lens information may also include any useful and required information, for example, the information may include a focal distance.

An orientation detection component or detector 81 detects the orientation of the camera, when a photograph is being taken. The orientation detection component 81 can comprise any conventional mechanism to determine orientation or posture. For example, the orientation detection device 81 may take the form of a tilt switch, such as a tilt switch including a pair of enclosed glass tubes with a conductive liquid, e.g., mercury, enclosed therein. At least one electrode may be placed within the pair of glass tubes so that when the orientation detection component is correctly positioned, the conductive liquid comes into contact with the electrode to conduct electricity and transmit a signal to indicate the orientation of the camera.

The signals from the photometer 11, the mode detection component 21, the lens information holder 41 and the orientation detection component 81 are all connected to a controller, for example, the CPU 61. The construction of the CPU 61 will now be explained in detail.

The CPU 61 includes at least an exposure calculator or re-calculator 161, a pattern weight selector 162 and a frequency analyzer 163. The exposure calculator 161 calculates or determines an exposure value, based on the output of the photometer and the input from the pattern weight selector 162.

The pattern weight selector 162 chooses or selects an appropriate weight or weighting coefficient from a memory 164 corresponding to the light brightness pattern from stored light brightness patterns. The pattern weight selector 162 selects the weights based on the mode detected by the mode detection component 21. Moreover, the extraction criteria in the pattern weight selector 162 for each photographic mode can be preset in the photometric device.

The operation of the fourth preferred embodiment will now be described with reference to FIG. 8. In step S401, the CPU acts to control the photometer and to carry out a multi-division light measurement. A photometric value is obtained in step S401. In step S402, orientation detection component 8 determines the orientation of the camera and sends an appropriate signal to CPU 61.

In step S403, the CPU 61 reads lens information sent from the lens information holder 41. In step S404, the CPU 61 determines the selected photographic mode M according to the mode detection component 21.

In step S405, the CPU 61 extracts a weight for the brightness pattern relating the particular mode M, determined in step S404. The weight is selected or extracted from the multiple brightness pattern stored in a memory 164, which can be part of the CPU 61. The extraction in step S405 relies on tables stored in the memory, which can be prepared in advance. For each mode and weight corresponding to the brightness for each mode. The determined weight is used for an exposure calculation, and a weight is determined for each vertical and horizontal frequency. For example, the weight corresponding to each frequency and weight value is determined by the lens information, the results of the photometry and other inputted information.

In step S406, a frequency or spectrum analysis results in a power spectrum being output. In step S407, a luminescent calculation for each frequency is determined based on the results of the frequency analysis of step S406 and the weight determined in step S405.

An example of the detection method will now be described. The lens information comprises at least focal distance. The determined weight changes according to the focal distance. Therefore, if the focal distance is large, the principle object in the object field gets bigger. Conversely, if the focal distance is small, the principle object gets smaller. When the principle object gets larger, the shading pattern generally is small, thus the power spectrum determined by a frequency analysis has a large concentration in low frequencies. Conversely, wherein the principle object gets smaller, the shading pattern will increase, and the power spectrum has a small concentration in the low frequencies. The determination of the numerical value for each weight may be determined and stored in a memory via previous weight determinations.

In particular, the detected mode can represent detection of a photographic mode, for example, a portrait, a landscape, sports and the like. A weight changes according to the selected mode. For example, when the portrait mode is selected, the image of the photographed object, a model or other subject of the portrait in the object field is generally large.

An example will now be provided with respect to the weight determination based on the brightness of an object field. The luminescence of the object field is detected, and a weight is determined based on the luminescence. A luminescence value EBV is derived from the output of the photometry. The weight is then determined corresponding to the object field either dark. When the object field is determined to be generally overall dark, shadows cannot be clearly distinguished, and it is difficult to adequately rely on the results of a frequency analysis.

However, when the object field is determined to generally overall bright, the shadows can be clearly distinguished. Thus, the results of the frequency analysis provides a large power spectrum for simple patterns, where the frequency is low. Moreover, a small power spectrum for complex patterns, where the frequency is high, can also be obtained. Therefore, a weight corresponding to an luminescence can be determined prior to other operations, and the photometry value can be accurately determined using that weight in the calculation according to the luminescence.

The calculation used to determine the luminescence value EVB (7) is determined using formula (2):

$$EVB(i, j, N) = \log_2(SO(i, j, N)) + OS \qquad (2)$$

where i is the horizontal frequency; j is the vertical frequency; N is the number of partitions, EVB is the determined luminescence of the partition area according to frequency, OS is the offset and the SO is the average output of the photometry for the particular partition area.

Formula 3 calculates the luminescence value EVS (i, j) for each frequency from the EVB (i, j, N) according to the following equation (3):

$$EVS(i,j) = (1/N) * \Sigma EVB(i, j, N) \qquad (3)$$

where EVS is the luminescent value for each frequency.

The luminescent value for each frequency can be calculated by repeatedly using the above equations using the average photometry. However, other photometry values may be used, as long as the values are consistent.

The luminescent for the weight frequency are of the power spectrum USO (i, j) is determined according to the following equation (4):

$$USO(i, j) = EVS(i, j) * W(i, j) \qquad (4)$$

where USO is the luminescent for the weight frequency and W is the particular weight.

In FIG. 8, the exposure calculation in step S408 determines an exposure value from the results of the luminescent value for each vertical and horizontal frequency, and from the frequency analysis, for example, a Fourier conversion.

The calculation method for the power spectrum PS is determined by equation (5):

$$PS\ (i,\ j) = (PR\ (,\ j)^2 * PF\ (i,\ j)\ ^2)^{1/2} \tag{5}$$

where PS is the power spectrum, PR is a real number resulting from the Fourier conversion and PF is an imaginary number resulting from the Fourier conversion.

Next, the total power spectrum PWG is calculated using equation (6):

$$PWG = \Sigma\Sigma PS\ (i,\ j) \tag{6}$$

where PWG is the total power spectrum.

Further, the luminescent value EVG is determined from the power spectrum, for both the frequency of the luminescent and the luminescent value of the vertical and horizontal frequencies. The calculation of the luminescent value is determined using equation (7):

$$EVG = \Sigma\Sigma(USO\ (i,\ j)\ *(PS\ (i,\ j)/P.G.)) \tag{7}$$

Therefore, an appropriate can be quickly and accurately determined because the weight, which changes with the numerical value, is added by way of the frequency analysis. Accordingly, an accurate and reliable exposure can be readily achieved.

The present invention is not limited to the above-described embodiments. Various alternatives and modifications are possible. For example, the Fourier transform, discussed above, is used only as an example of spectral analysis. A discrete cosine transform, using only the cosine function, a discrete sine transform, using only the sine function, or a Wallis transform, using a Wallis function that is a binary-value function with +1 or −1, may also be used.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photometric device for accurately determining an exposure value in a camera, comprising:
   an initial condition indicator that outputs initial photographic conditions;
   a photometer that divides a subject field into multiple regions, analyzes light and outputs a frequency as a result of the analysis;
   a memory that contains sets of weighting coefficients, each set of weighting coefficients corresponding to a respective light brightness pattern; and
   a controller that outputs a corrected exposure value coupled to the photometer, initial condition indicator and memory, comprising:
     an exposure calculator that determines an exposure value based on the frequency output of the photometer,
     a selector that chooses a set of weighting coefficients from the memory that corresponds to a light brightness pattern that most closely resembles the initial photographic conditions output by the initial condition indicator,
     a frequency analyzer that receives the frequency output from the photometer and determines an associated power spectrum, and
     a re-calculator that determines a corrected exposure value using the power spectrum from the frequency analyzer and the set of weighting coefficients chosen by the selector.

2. A photometric device according to claim 1, wherein the initial condition indicator includes a photographic mode setter that outputs photography conditions based on preset photographic modes.

3. A photometric device according to claim 2, wherein the preset photographic modes include at least a panoramic photographic mode.

4. A photometric device according to claim 1, wherein the initial condition indicator includes a lens information holder that detects information of the camera lens.

5. A photometric device according to claim 4, wherein the information is a focus length.

6. A photometric device according to claim 1, wherein the memory includes a table having multiple components consisting of the weighting coefficients and wherein the selector chooses a component from among the multiple components.

7. A photometric device according to claim 1, further including an exposure controller coupled to the controller, the controller outputting the corrected exposure value to the exposure controller, wherein the exposure controller is adapted to control a shutter and a diaphragm of a camera.

8. A photometric device according to claim 1, wherein the initial condition indicator includes brightness information for the subject field.

9. A photometric device according to claim 1, further comprising an orientation detector that detects the orientation of a camera, the orientation detector comprising a tilt switch.

10. A photometric device for a camera, comprising:
   initial condition indicating means for outputting initial photographic conditions;
   photometer means for dividing a subject field into multiple regions and analyzing light, the photometer means also outputting a frequency as a result of the analyzing;
   memory means for containing sets of weighting coefficients, each set of weighting coefficients corresponding to a respective light brightness pattern; and
   controlling means for outputting a corrected exposure value coupled to the photometer means, initial condition indicating means and memory means, comprising:
     exposure calculating means for determining an exposure value based on the frequency output of the photometer means,
     selecting means for choosing a set of weighting coefficients from the memory that corresponds to a light brightness pattern that most closely resembles the initial photographic conditions output by the initial condition indicating means,
     frequency analyzing means for receiving the frequency output from the photometer means and determining an associated power spectrum, and
     re-calculating means for determining a corrected exposure value, using the power spectrum from the frequency analyzing means and the set of weighting coefficients chosen by the selecting means.

11. A photometric device according to claim 10, wherein the initial condition indicating means is photographic setting means for outputting photographic conditions based on preset photographic modes.

12. A photometric device according to claim 11, wherein the preset photographic modes include at least a panoramic photographic mode.

13. A photometric device according to claim 10, wherein the initial condition indicating means includes a lens information holding means for detecting information of the camera lens.

14. A photometric device according to claim 10, wherein the memory means includes a table having multiple components consisting of the weighting coefficients and the selecting means chooses a component from among the multiple table components.

15. A photometric device according to claim 10, further including exposure controlling means for controlling the exposure of the camera coupled to the controlling means, the re-calculating means outputting the corrected exposure value to the exposure controlling means, wherein the exposure controlling means is adapted to control a shutter and diaphragm of the camera.

16. A photometric device according to claim 10, further comprising an orientation detector that detects the orientation of a camera, the orientation detector comprising a tilt switch.

17. A photometry method for accurately determining an exposure value of a camera, the method comprising the steps of:

storing sets of weighting coefficients, each set of weighting coefficients corresponding to a respective light brightness pattern;

outputting initial photographic conditions;

dividing a subject field into multiple regions;

analyzing ambient light for each region and outputting a frequency as a result of the analyzing step;

determining an exposure value based on the output frequency;

selecting a set of weighting coefficients that corresponds to a light brightness pattern that most closely resembles the initial photographic conditions;

determining a power spectrum associated with the outputted frequency; and determining a corrected exposure value using the exposure value, the power spectrum and the selected set of weighting coefficients.

18. A photometric method according to claim 17, wherein the step of outputting initial photography conditions includes the step of outputting photographic conditions based on preset photographic mode.

19. A photometric method according to claim 17, wherein the preset photographic modes include at least a panoramic photographic mode.

20. A photometric method according to claim 17, wherein the step of outputting initial photography conditions includes the step of detecting information concerning the camera lens.

21. A photometric device according to claim 17, wherein the weighting coefficients are stored in a memory and the memory includes a table having multiple components consisting of the weighting coefficients, the method further including the step of selecting a component from among the multiple components in the memory.

22. A photometric method according to claim 17, further comprising detecting the orientation of the camera using a tilt surface.

23. A photometric device for accurately determining an exposure value in a camera, comprising:

an orientation detector that detects the orientation of a camera, the orientation detector comprising a tilt switch;

a photometer that divides a subject field into multiple regions, analyzes light and outputs a frequency as a result of the analysis;

a memory that contains sets of weighting coefficients, each set of weighting coefficients corresponding to a respective light brightness pattern; and a controller that outputs a corrected exposure value coupled to the photometer, orientation detector and memory, the controller comprising:

an exposure calculator that determines an exposure value based on the frequency output of the photometer, a selector that chooses a set of weighting coefficients from the memory that corresponds to a light brightness pattern that most closely resembles initial photographic conditions;

a frequency analyzer that receives the frequency output from the photometer and determines an associated power spectrum, and a re-calculator that determines a corrected exposure value using the power spectrum from the frequency analyzer and the set of weighting coefficients chosen by the selector.

24. A photometric device according to claim 23, further comprising a photographic mode setter that outputs photography conditions based on preset photographic modes to the selector.

25. A photometric device according to claim 23, wherein the preset photographic modes include at least a panoramic photographic mode.

26. A photometric device according to claim 24, further comprising a lens information holder that detects information of the camera lens.

27. A photometric device according to claim 23, wherein the memory includes a table having multiple components consisting of the weighting coefficients and wherein the selector chooses a component from among the multiple components.

28. A photometric device according to claim 23, wherein the frequency analyzer calculates a power spectrum for the subject field based on the output of the photometer.

29. A photometric device according to claim 23, further including an exposure controller coupled to the controller, the controller outputting the corrected exposure value to the exposure controller, wherein the exposure controller is adapted to control a shutter and a diaphragm of a camera.

30. A photometric device for accurately determining an exposure value in a camera, comprising:

an initial condition indicator that outputs initial photographic conditions;

a photometer that divides a subject field into multiple regions, analyzes light and outputs a frequency as a result of the analysis;

a memory that contains sets of weighting coefficients, each set of weighting coefficients corresponding to a respective light brightness pattern; and a controller that outputs a corrected exposure value coupled to the photometer, initial condition indicator and memory, including:

an exposure calculator that determines an exposure value based on the frequency output of the photometer, a selector that chooses a set of weighting coefficients from the memory that corresponds to a light brightness pattern that most closely resembles the initial photographic conditions output by the initial condition indicator, a frequency analyzer that analyzes the frequency output from the photometer, and a re-calculator that determines a corrected exposure value based on the analyzed frequency from the frequency analyzer and the set of weighting coefficients chosen by the selector, wherein the frequency analyzer calculates a power spectrum for the subject field based on the output of the photometer and the re-calculator further determines a correction value Ho for determining the corrected exposure value, according to the following formula:

$$Ho = \Sigma\Sigma W(i,j) \cdot P(i,j),$$

where $P(i,j)$ is the power spectrum from the frequency analyzer and $W(i,j)$ is the set of weighting coefficients.

31. A photometric device for a camera, comprising:

initial condition indicating means for outputting initial photographic conditions;

photometer means for dividing a subject field into multiple regions and analyzing light, the photometer means also outputting a frequency as a result of the analyzing;

memory means for containing sets of weighting coefficients, each set of weighting coefficients corresponding to a respective light brightness pattern; and controlling means for outputting a corrected exposure value coupled to the photometer means, initial condition indicating means and memory means, including:

exposure calculating means for determining an exposure value based on the frequency output of the photometer means, selecting means for choosing a set of weighting coefficients from the memory that corresponds to a light brightness pattern that most closely resembles the initial photographic conditions output by the initial condition indicating means, frequency analyzing means for analyzing the frequency output from the photometer means, and re-calculating means for determining a corrected exposure value, based on the analyzed frequency of the frequency analyzing means and the set of weighting coefficients chosen by the selecting means, wherein the frequency analyzing means calculates a power or light brightness spectrum for the subject field based on the output of the photometer means and the recalculating means further determines a correction value Ho for determining the corrected exposure value according to the following formula:

$$Ho = \Sigma\Sigma W(i,j) \cdot P(i,j),$$

where $P(i,j)$ is the power spectrum from the frequency analyzer and $W(i,j)$ is the set of weighting coefficients.

32. A photometry method for accurately determining an exposure value of a camera, the method comprising the steps of:

storing sets of weighting coefficients, each set of weighting coefficients corresponding to a respective light brightness pattern;

outputting initial photographic conditions;

dividing a subject field into multiple regions;

analyzing ambient light for each region and outputting a frequency as a result of the analyzing step;

determining an exposure value based on the output frequency;

selecting a set of weighting coefficients that corresponds to a light brightness pattern that most closely resembles the initial photographic conditions;

analyzing the outputted frequency; and determining a corrected exposure value based on the exposure value, the output frequency and the selected set of weighting coefficients, wherein the step of analyzing the output frequency further includes the step of calculating a power spectrum for the subject field;

wherein the step of determining further includes the step of calculating a correction value Ho for the calculating step, according to the following formula:

$$Ho = \Sigma\Sigma W(i,j) \cdot P(i,j)$$

where $P(i,j)$ is the power spectrum and $W(i,j)$ is the set of weighting coefficients.

33. A photometric method according to claim 30, further including the step of outputting the re-calculated exposure value to an exposure controller, wherein the exposure controller is adapted to control a shutter and a diaphragm of the camera.

* * * * *